(12) United States Patent
Chhabra

(10) Patent No.: US 7,870,382 B2
(45) Date of Patent: Jan. 11, 2011

(54) AUDITABLE AND TRACK-ABLE KEY DISTRIBUTION AND INSTALLATION SYSTEM AND METHOD FOR WIRELESS NETWORKS

(75) Inventor: Jasmeet Chhabra, Hillsboro, OR (US)

(73) Assignee: Intel Corporation, Santa Clara, CA (US)

( * ) Notice: Subject to any disclaimer, the term of this patent is extended or adjusted under 35 U.S.C. 154(b) by 1578 days.

(21) Appl. No.: 11/026,619

(22) Filed: Dec. 30, 2004

(65) Prior Publication Data

US 2006/0149964 A1    Jul. 6, 2006

(51) Int. Cl.
*H04L 29/06* (2006.01)
*G06Q 30/00* (2006.01)
*G06F 15/16* (2006.01)

(52) U.S. Cl. .......................... 713/153; 705/26; 709/228
(58) Field of Classification Search ................. 713/153; 705/26; 709/228
See application file for complete search history.

(56) References Cited

U.S. PATENT DOCUMENTS

| | | | | |
|---|---|---|---|---|
| 7,321,784 B2 * | 1/2008 | Serceki et al. .............. 455/557 |
| 7,383,333 B2 * | 6/2008 | Philyaw et al. .............. 709/224 |
| 2004/0124966 A1 * | 7/2004 | Forrest ....................... 340/5.8 |
| 2004/0133689 A1 * | 7/2004 | Vasisht ....................... 709/228 |
| 2005/0038710 A1 * | 2/2005 | Zimmerman et al. .......... 705/26 |
| 2005/0044372 A1 * | 2/2005 | Aull et al. ................... 713/176 |
| 2006/0072541 A1 * | 4/2006 | Pecus ......................... 370/351 |
| 2006/0111105 A1 * | 5/2006 | Bajar et al. .............. 455/435.1 |

* cited by examiner

*Primary Examiner*—Shin-Hon Chen
(74) *Attorney, Agent, or Firm*—Crystal D. Sayles

(57) ABSTRACT

An auditable and track-able key distribution and installation method and system for wireless networks. The method includes registering an installation device and writing a one time use key to the installation device. When an installer installs nodes onto a network, with each installation of a node, the one time use key is read by the node using the installation device to enable the node to be authenticated onto the network and the one time use key on the installation device is overwritten with another one time use key for installing the next node onto the network. After the nodes have been installed, an installation closeout and audit process is performed to make sure that none of the one time use keys have been stolen or copied.

28 Claims, 3 Drawing Sheets

AUDITABLE AND TRACK-ABLE KEY DISTRIBUTION AND INSTALLATION SYSTEM AND METHOD FOR WIRELESS NETWORKS

BACKGROUND OF THE INVENTION

1. Field of the Invention

Embodiments of the present invention are generally related to the field of secure wireless networks. More particularly, embodiments of the present invention are related to an auditable and track-able key distribution and installation system and method for wireless networks.

2. Description

The requirements for key distribution in enterprise wireless networks are inherently different from home networks. Some enterprise and commercial networks can be really large, consisting of hundreds of nodes and requiring multiple people to install. For security reasons, some sort of secret (i.e., key) needs to be transferred to the nodes for authentication. If the secret is one that is shared amongst all of the nodes in the wireless network, and the secret is stolen or copied by an attacker, then the entire network is compromised.

Thus, what is needed is a system and method for installation of a wireless network that provides a secret (i.e., key) at each node in the network that does not compromise the entire network if the secret is stolen or copied. What is also needed is a system and method for installation of a wireless network that distributes auditable and track-able keys to the nodes in a manner that enables the detection of key copying, key stealing, and other attacks on the network.

BRIEF DESCRIPTION OF THE DRAWINGS

The accompanying drawings, which are incorporated herein and form part of the specification, illustrate embodiments of the present invention and, together with the description, further serve to explain the principles of the invention and to enable a person skilled in the pertinent art(s) to make and use the invention. In the drawings, like reference numbers generally indicate identical, functionally similar, and/or structurally similar elements. The drawing in which an element first appears is indicated by the leftmost digit(s) in the corresponding reference number.

DETAILED DESCRIPTION OF THE INVENTION

While the present invention is described herein with reference to illustrative embodiments for particular applications, it should be understood that the invention is not limited thereto. Those skilled in the relevant art(s) with access to the teachings provided herein will recognize additional modifications, applications, and embodiments within the scope thereof and additional fields in which embodiments of the present invention would be of significant utility.

Reference in the specification to "one embodiment", "an embodiment" or "another embodiment" of the present invention means that a particular feature, structure or characteristic described in connection with the embodiment is included in at least one embodiment of the present invention. Thus, the appearances of the phrase "in one embodiment" or "in an embodiment" appearing in various places throughout the specification are not necessarily all referring to the same embodiment.

Embodiments of the present invention are directed to an auditable and track-able key distribution and installation system and method for wireless networks. This is accomplished by using an automatically updateable, track-able, and auditable installation token device to install a new one time use key at each node of the wireless network. The installation token device includes two counters for keeping track of the number of times the installation token has been written to and read from, respectively. If the one time use key is copied and reused, the duplicate is easily detected and the key sequence is revoked. If a one time use key is stolen and used to authenticate a node without the authorized installer's knowledge, evidence of the stolen key may be detected from the counters as well as from any installer information provided. Only the authorized number of nodes installed may be authenticated onto the network.

Although embodiments of the present invention are described for enterprise and commercial wireless networks, the invention is not limited to enterprise and commercial wireless networks. One skilled in the relevant art(s) would know that the invention is equally applicable to other types of networks where key distribution is required. For example, embodiments of the present invention may also be applicable to smaller network environments, such as, for example, an adhoc network where key distribution is required. In an adhoc network of laptop computers, one of the laptop computers may act as a key server for issuing the one time use key. The one time use keys may then be distributed to the laptops. This ensures that only an authorized number of laptops may join the network.

Embodiments of the present invention are described as being implemented in a mesh network. One skilled in the relevant art(s) would know that embodiments of the present invention may also be implemented in non-mesh networks as well.

Figure 1:
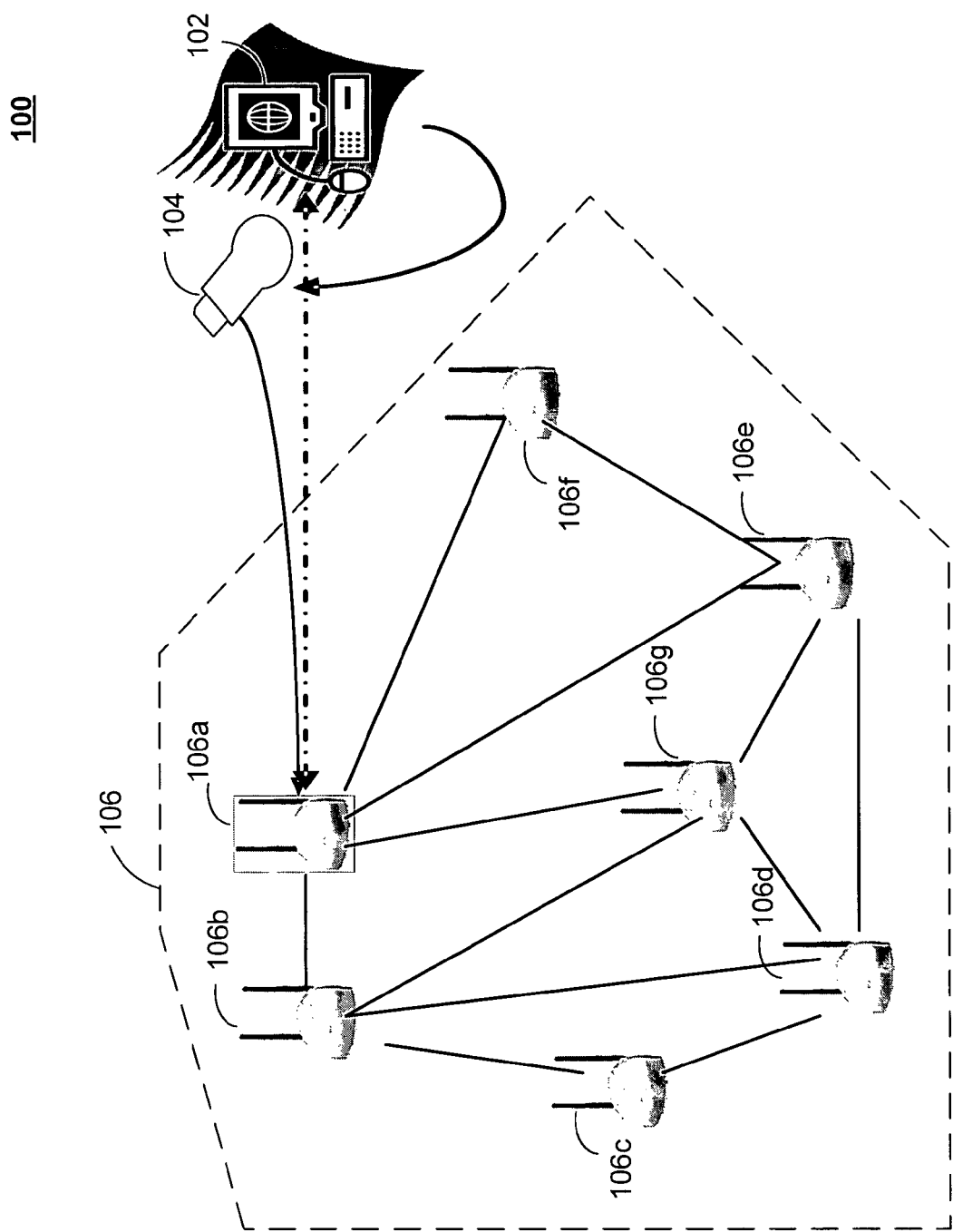
FIG. 1 is a diagram illustrating an exemplary system for auditable and track-able key distribution and installation of wireless networks according to an embodiment of the present invention.

FIG. 1 is a diagram illustrating an exemplary system 100 for auditable and track-able key distribution and installation of wireless networks according to an embodiment of the present invention. System 100 comprises a key server 102, an installation token 104, and a wireless mesh network 106. Wireless mesh network 106 comprises a plurality of nodes/wireless devices 106a-106g. Key server 102 may communicate with any one of nodes/wireless devices 106a-106g via a wireless connection. Installation token 104 may communicate with key server 102 and any one of nodes/wireless devices 106a-106g using an interface (not shown).

As shown in FIG. 1, nodes/wireless devices 106a-106g of wireless network 106 are arranged in a mesh topology. Nodes/wireless devices 106a-106g are shown as being connected together in a wireless fashion. The nodes or wireless devices 106a-106g of wireless network 106 have at least two viable direct routes or connections at all times, and may support multiple hops between a source and destination. For example, wireless device 106a is shown as having four viable direct routes to nodes/wireless devices 106b, 106e, 106f, and 106g, but may connect to nodes/wireless devices 106c and 106d by hopping. Wireless device 106f is shown as having two viable routes to nodes/wireless devices 106a and 106e, but may connect to nodes/wireless devices 106b, 106c, 106d, and 106g by hopping. This allows each of nodes/wireless devices 106a-106g to be able to communicate with any one of nodes/wireless devices 106a-106g.

Key server 102 provides the one time use keys to be installed on the nodes/wireless devices in a network for authentication purposes. When an authorized installer is ready to install one or more nodes/wireless devices onto the wireless network, the installer registers with key server 102. The installer provides key server 102 with the number of nodes that the installer expects to install and a maximum installation time in which the installer expects to complete the installation. The maximum installation time serves as the expiration time for installation token 104. The installer must also register the counters (described below) on installation token 104 with key server 102. On completion of the registration period, key server 102 updates installation token 104 with a one time use key that may be used to authenticate a single node on a wireless network, such as wireless network 106. In one embodiment, this process may be performed automatically by inserting installation token 104 into a special interface on key server 102. In other embodiments, this process may be performed manually. Key server 102 may update installation token 104 with a new one time use key after the current one time use key is used to authenticate a node on the network.

Installation token 104 may be an updateable memory based device that is capable of receiving and dispensing the one time use key. Installation token 104 may be used to install the one time use keys on the nodes/wireless devices that are being installed on the wireless network to enable the nodes/wireless devices to authenticate themselves onto the network. A different one time use key is used for each node/device installed on the network. Thus, at any given time, installation token 104 is only equipped with a single one time use key. Upon installation of the single one time use key into a newly installed node/wireless device on the network, the newly installed node/wireless device may use this one time use key to authenticate itself onto the network. After the node/wireless device has been authenticated, the current one time use key on installation token 104 is replaced (i.e., overwritten) with a new one time use key. The new one time use key is provided by key server 102 through the newly authenticated node/wireless device. This prevents the installer from installing more than the number of nodes that were registered with key server 102. After the last node/wireless device is installed onto the network, installation token 104 is no longer updated with a new one time use key. This ensures that no more nodes will be introduced into the network using installation token 104 without installation token 104 registering for a new set of installations. Thus, key server 102 only allows the number of authorized nodes/wireless devices to be authenticated into the network.

Installation token 104 also includes two counters (not explicitly shown). One counter records the number of times installation token 104 has been written to and the other counter records the number of times installation token 104 has been read. In one embodiment, an installer may be required to perform an installation closeout process with key server 102. The installer may also be required to provide a report of the installer's accounting of the installation process. The report may include, but is not limited to, an accounting of the number of nodes actually installed by the authorized installer. During the installation closeout process, the counters on installation token 104 (i.e., the number of times installation token 104 was written to and/or read) are checked to make sure that the number of nodes/wireless devices installed in the network match the number of nodes/wireless devices installed by the authorized installer. If a mismatch occurs, key server 102 may detect an unauthorized usage of the one time use keys and revoke the key sequence, if necessary. With embodiments of the present invention, when any one of the one time use keys has been compromised, key server 102 may revoke the compromised key sequence to which the key belongs or a part thereof without compromising the entire network.

Figure 2:
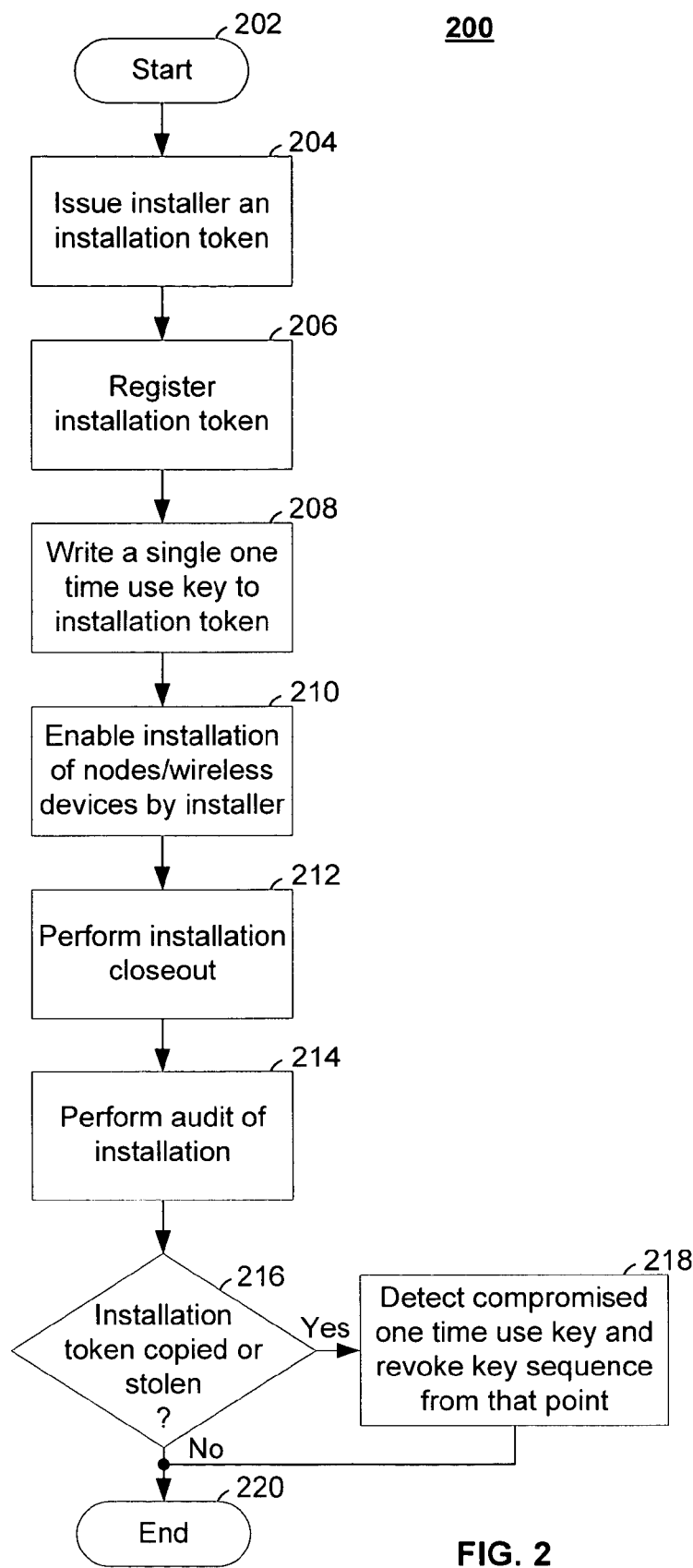
FIG. 2 is a flow diagram describing an exemplary method for installing an auditable and track-able key distribution system for wireless networks according to an embodiment of the present invention.

FIG. 2 is a flow diagram 200 describing an exemplary method for installing an auditable and track-able key distribution system for wireless networks according to an embodiment of the present invention. The invention is not limited to the embodiment described herein with respect to flow diagram 200. Rather, it will be apparent to persons skilled in the relevant art(s) after reading the teachings provided herein that other functional flow diagrams are within the scope of the invention. The process begins with block 202, where the process immediately proceeds to block 204.

In block 204, an installer is issued an installation token. The installation token is an updateable memory based device. The installation token is capable of receiving and dispensing a one time use key. The one time use key is used to authenticate a newly established node/wireless device in a network.

In block 206, the installation token is registered with the key server. As previously indicated, during registration of the installation token, the installer provides the key server with the number of nodes/wireless devices the installer expects to install on the network and the amount of time the installer needs to install the nodes/wireless devices onto the network. The installer should provide the key server with a worst case estimate for the time to install the nodes/wireless devices since this time will be designated as an expiration time for the installation token. In other words, when this time expires, the installation token will no longer be operable for node/wireless device installations. As part of the registration process, the installer must also provide the key server with the counter display values on the installation token. In one embodiment, the registration process is performed when the installer connects the installation token to the key server via a special interface. Interfacing the installation token to the key server allows the key server to retrieve the counter values automatically.

In block 208, a single one time use key is written to the installation token from the key server. At this time, the write counter on the installation token is incremented and the one time use key is set as the expected key. The process then proceeds to block 210.

In block 210, the installer installs the nodes/wireless devices onto the network. This process is described below with reference to FIG. 3. The process then proceeds to block 212.

In block 212, after the nodes/wireless devices have been installed, an installation closeout process is performed. During the installation closeout process, the installer provides the installation token to the key server via the special interface connection to enable the key server to read the counter display values. The installer may also provide the key server with a report of the installation process. The report may include the installer's accounting of what went on during the installation process. For example, the report may include, but is not limited to, how many nodes/wireless devices were installed, how many one time use keys were dispensed from the installation token, etc. The information received from the authorized installer may later be matched with the information obtained from the counters on the installation token and counters kept by the key server to detect whether the network has been compromised. The process then proceeds to block 214.

In block 214, the key server performs an audit. The audit process allows the key server to keep track of certain statistics and events that occurred during the entire installation process. The statistics and events may include, but are not limited to, how many one time use keys were dispensed, which one time use key was installed on which device, etc. Also during the audit process, the key server will compare the counter values obtained from the installation closeout process with the values stored in the key server and the values obtained from the installer's report to determine whether the numbers match. If the numbers do not match, this may imply that the installation token was stolen or copied and used to install an unauthorized node/wireless device. The process then proceeds to decision block 216.

In decision block 216, it is determined whether the installation token was stolen or copied by detecting counter mismatches. If it is determined that the installation token was stolen or copied, the process proceeds to block 218.

In block 218, if counter mismatches occur, the key sequence may be revoked. If any one of the one time use keys were used to authenticate a node without the knowledge of the installer, that one time use key may be detected using the installer's and the key server's accounting information and the key sequence from that point may be revoked. The process then proceeds to block 220, where the process ends.

Returning to decision block 216, if it is determined that none of the one time use keys were copied or stolen, the process proceeds to block 220, where the process ends.

Figure 3:
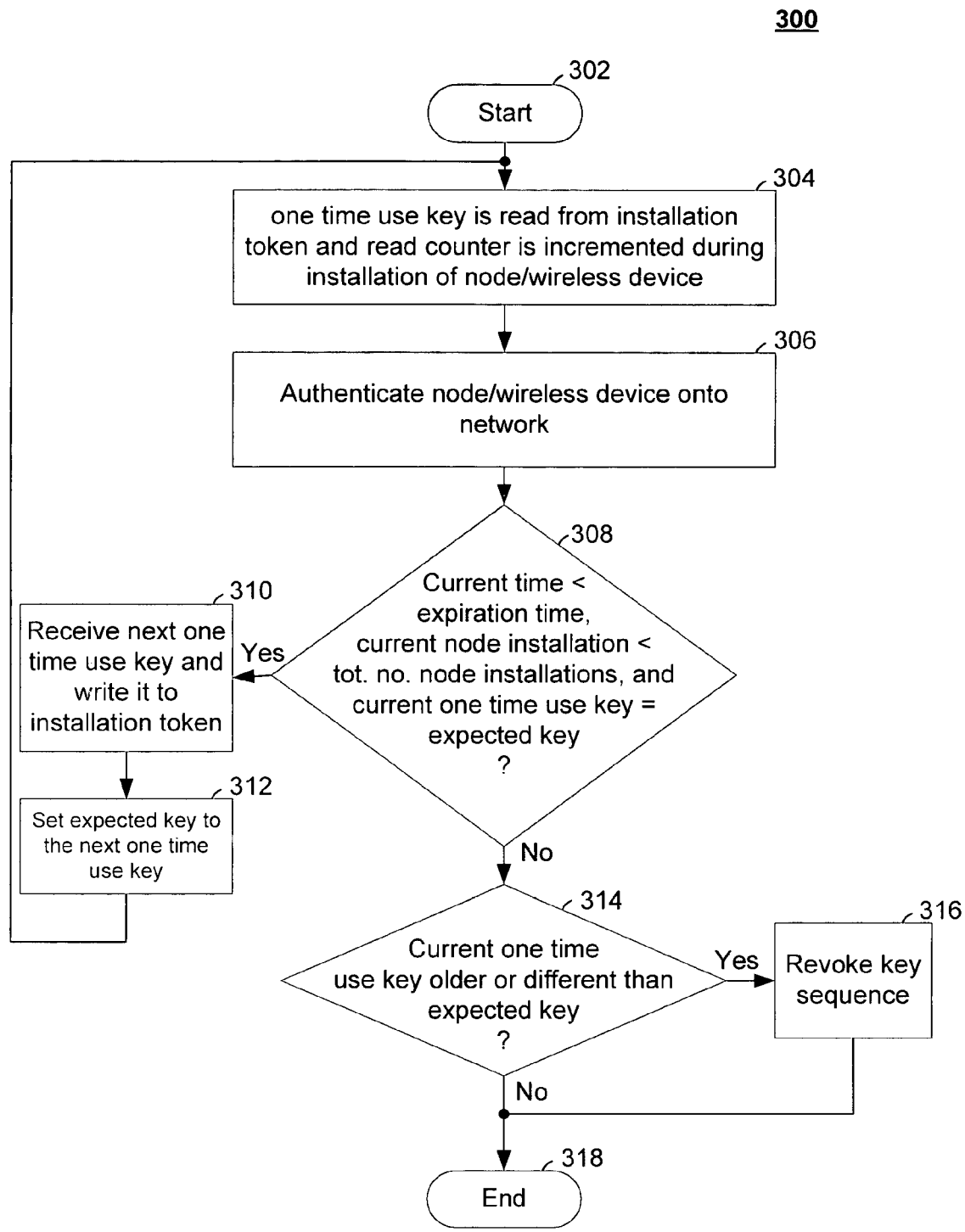
FIG. 3 is a flow diagram describing an exemplary installation method for installing nodes/wireless devices onto a wireless network according to an embodiment of the present invention.

FIG. 3 is a flow diagram 300 describing an exemplary installation method for installing nodes/wireless devices onto a wireless network according to an embodiment of the present invention. The invention is not limited to the embodiment described herein with respect to flow diagram 300. Rather, it will be apparent to persons skilled in the relevant art(s) after reading the teachings provided herein that other functional flow diagrams are within the scope of the invention. The process begins with block 302, where the process immediately proceeds to block 304.

In block 304, the node/wireless device is installed in the network. When the node/wireless device has been installed, the installed node/wireless device reads the one time use key from the installation token via a special interface. When the one time use key is read, the read counter on the installation token is incremented. The process then proceeds to block 306.

In block 306, the node/wireless device is authenticated onto the network using the one time use key. Authentication processes are well known in the relevant art(s). Any known authentication process that authenticates nodes/wireless devices onto a network may be used. The process then proceeds to decision block 308.

In decision block 308, it is determined whether the current time is less than the expiration time, the current node/wireless device installation is less than the total number of nodes/wireless devices to be installed, and the current one time use key is the expected key. If the current time is less than the expiration time, the current node/wireless device installation is less than the total number of nodes/wireless devices to be installed, and the current one time use key is the expected key, then the process proceeds to block 310.

In block 310, the key server sends the next one time use key to the current authenticated node/wireless device, which in turn writes the next one time use key onto the installation token. Writing the next one time use key onto the installation token causes the write counter to be incremented. The process then proceeds to block 312.

In block 312, the expected key is set to the next one time use key. The process then proceeds back to block 304 to install the next node/wireless device onto the network.

In one embodiment, prior to installing the next node/wireless device, the installer may be required to send the counter values from the installation token to the key server. The counter information is transmitted to the key server by way of the newly authenticated node/wireless device. Sending the counter information to the key server after every node/wireless device installation allows the key server to do mini audits during the entire installation process and provides the key server with the ability to detect a copied or stolen key in a more efficient manner.

Returning to decision block 308, if it is determined that the current time is not less than the expiration time or the current node/wireless device installation is not less than the total number of nodes/wireless devices to be installed or the current one time use key is not the expected key, then the process proceeds to decision block 314. In decision block 314, it is determined whether the current one time use key is older or different than the expected key. If the current one time use key is older or different than the expected key, then the process proceeds to block 316.

In block 316, the key sequence is revoked. The process then proceeds to block 318, where the process ends.

Returning to decision block 314, if it is determined that the current one time use key is not older than the expected key, then the process proceeds to block 318, where the process ends.

Certain aspects of embodiments of the present invention may be implemented using hardware, software, or a combination thereof and may be implemented in one or more computer systems or other processing systems. In fact, in one embodiment, the methods may be implemented in programs executing on programmable machines such as mobile or stationary computers, personal digital assistants (PDAs), set top boxes, cellular telephones and pagers, and other electronic devices that each include a processor, a storage medium readable by the processor (including volatile and non-volatile memory and/or storage elements), at least one input device, and one or more output devices. Program code is applied to the data entered using the input device to perform the functions described and to generate output information. The output information may be applied to one or more output devices. One of ordinary skill in the art may appreciate that embodiments of the invention may be practiced with various computer system configurations, including multiprocessor systems, minicomputers, mainframe computers, and the like. Embodiments of the present invention may also be practiced in distributed computing environments where tasks may be performed by remote processing devices that are linked through a communications network.

Each program may be implemented in a high level procedural or object oriented programming language to communicate with a processing system. However, programs may be implemented in assembly or machine language, if desired. In any case, the language may be compiled or interpreted.

Program instructions may be used to cause a general-purpose or special-purpose processing system that is programmed with the instructions to perform the methods described herein. Alternatively, the methods may be performed by specific hardware components that contain hardwired logic for performing the methods, or by any combination of programmed computer components and custom hardware components. The methods described herein may be provided as a computer program product that may include a machine readable medium having stored thereon instructions that may be used to program a processing system or other electronic device to perform the methods. The term "machine readable medium" or "machine accessible medium" used herein shall include any medium that is capable of storing or encoding a sequence of instructions for execution by the machine and that causes the machine to perform any one of the methods described herein. The terms "machine readable medium" and "machine accessible medium" shall accordingly include, but not be limited to, solid-state memories, optical and magnetic disks, and a carrier wave that encodes a data signal. Furthermore, it is common in the art to speak of software, in one form or another (e.g., program, procedure, process, application, module, logic, and so on) as taking an action or causing a result. Such expressions are merely a shorthand way of stating the execution of the software by a processing system to cause the processor to perform an action or produce a result.

While various embodiments of the present invention have been described above, it should be understood that they have been presented by way of example only, and not limitation. It will be understood by those skilled in the art that various changes in form and details may be made therein without departing from the spirit and scope of the invention as defined in the appended claims. Thus, the breadth and scope of the present invention should not be limited by any of the above-described exemplary embodiments, but should be defined in accordance with the following claims and their equivalents.

What is claimed is:

1. An installation method comprising:
   registering an installation device;
   writing a one time use key to the installation device;
   enabling an installer to install nodes onto a network, wherein with each installation of a node, the one time use key is read by the node using the installation device to enable the node to be authenticated onto the network using the one time use key and the one time use key on the installation device is overwritten with another one time use key for installing the next node;
   performing an audit of the installation process;
   if any one time use key was copied or stolen, detecting the compromised one time use key and revoking the key sequence from that point; and
   performing installation closeout once the nodes have been installed onto the network.

2. The method of claim 1, wherein performing an audit of the installation process comprises:
   tracking installed nodes with the one time use keys read by the installed nodes;
   comparing one time use keys dispensed by the installation device and one time use keys written to the installation device with one time use key information stored on a key server; and
   determining whether any one time use keys were copied or stolen.

3. The method of claim 1, wherein prior to registering an installation device, the method comprises issuing the installer the installation device.

4. The method of claim 1, wherein registering an installation device comprises providing a number of nodes to be installed, a maximum time to complete the installation, and counter values for a read and write counter from the installation device.

5. The method of claim 1, wherein registering an installation device includes interfacing the installation device to a key server to provide the key server with a number of nodes to be installed, a maximum time to complete the installation, and counter values for a read and write counter from the installation device.

6. The method of claim 1, wherein performing installation closeout once the nodes have been installed onto the network comprises providing current values of a read counter and a write counter for the installation device, wherein the read counter is incremented each time the one time use key is read from the installation device by a node and the write counter is incremented each time the one time use key is written to the installation device during the installation.

7. The method of claim 1, wherein when the one time use key is read by the node, a read counter on the installation device is incremented.

8. The method of claim 1, wherein writing the one time use key to the installation device further comprises incrementing a write counter on the installation device.

9. The method of claim 1, wherein overwriting the one time use key with the next one time use key further comprises incrementing a write counter on the installation device.

10. The method of claim 1, wherein registering an installation device includes indicating a maximum installation time to install the nodes onto the network, the method further comprising setting the maximum installation time to install the nodes onto the network equal to an expiration time, wherein the installation device becomes inoperable for installing any more nodes if a current installation time exceeds the expiration time.

11. The method of claim 1, wherein writing the one time use key to the installation device further comprises setting an expected key value equal to the one time use key and wherein overwriting the one time use key with the next one time use key further comprises setting the expected key value equal to the next one time use key.

12. The method of claim 11, wherein if it is determined that a current one time use key is older than the expected key value, revoking a key sequence from the installed nodes.

13. The method of claim 1, wherein if a current number of nodes installed is equal to or more than a total number of nodes to be installed, ending the installation process.

14. An installation system comprising:
   a key server, the key server to generate one time use keys for installing nodes in a network; and
   an installation token, the installation token to receive a one time use key from the key server and enable a node being installed onto the network to read the one time use key, wherein when the node reads the one time use key from the installation token, the node to use the one time use key to authenticate the node onto the network, wherein when the node has been authenticated onto the network, the installation token to receive a next one time use key to install another node onto the network; and
   the key server detects whether the one time use key has been copied or stolen by comparing a read and a write counter to one time use key information stored on the key server and installer accounting information, and if the one time use key has been copied or stolen, the key server to revoke a key sequence to which the one time use key belongs or a part thereof from the network.

15. The system of claim 14, wherein the installation token comprises the read counter and the write counter, the write counter to be incremented when the installation token receives the one time use key from the key server and the read counter to be incremented when the node reads the one time use key from the installation token.

16. The system of claim 14, wherein the network is a wireless network.

17. An article comprising: a non-transitory storage medium having a plurality of machine accessible instructions, wherein when the instructions are executed by a processor, the instructions provide for:
- registering an installation device;
- writing a one time use key to the installation device;
- enabling an installer to install nodes onto a network, wherein with each installation of a node, the one time use key is read by the node using the installation device to enable the node to be authenticated onto the network and the one time use key on the installation device is overwritten with another one time use key for installing the next node;
- performing an audit of the installation process;
- if any one time use key was copied or stolen, detecting the compromised one time use key and revoking the key sequence from that point; and
- performing installation closeout once the nodes have been installed onto the network.

18. The article of claim 17, wherein instructions for performing an audit of the installation process comprises instructions for:
- tracking installed nodes with the one time use keys read by the installed nodes
- comparing one time use keys dispensed by the installation device and one time use keys written to the installation device with one time use key information stored on a key server; and
- determining whether any one time use keys were copied or stolen.

19. The article of claim 17, wherein instructions for registering an installation device includes instructions for interfacing the installation device to a key server to provide the key server with a number of nodes to be installed, a maximum time to complete the installation, and counter values for a read and write counter from the installation device.

20. The article of claim 17, wherein instructions for performing installation closeout once the nodes have been installed onto the network comprises instructions for providing current values of a read counter and a write counter for the installation device, wherein the read counter is incremented each time the one time use key is read from the installation device by a node and the write counter is incremented each time the one time use key is written to the installation device during the installation.

21. The article of claim 17, wherein the node is authenticated using the one time use key.

22. The article of claim 17, wherein when the one time use key is read by the node, instructions are provided for incrementing a read counter on the installation device.

23. The article of claim 17, wherein instructions for writing the one time use key to the installation device further comprises instructions for incrementing a write counter on the installation device.

24. The article of claim 17, wherein instructions for overwriting the one time use key with the next one time use key further comprises instructions for incrementing a write counter on the installation device.

25. The article of claim 17, wherein instructions for registering an installation device includes instructions for indicating a maximum installation time to install the nodes onto the network, the article further comprising instructions for setting the maximum installation time to install the nodes onto the network equal to an expiration time, wherein the installation device becomes inoperable for installing any more nodes if a current installation time exceeds the expiration time.

26. The article of claim 17, wherein instructions for writing the one time use key to the installation device further comprises instructions for setting an expected key value equal to the one time use key and wherein instructions for overwriting the one time use key with the next one time use key further comprises instructions for setting the expected key value equal to the next one time use key.

27. The article of claim 26, wherein if it is determined that a current one time use key is older than the expected key value, further comprising instructions for revoking a key sequence from the installed nodes.

28. The article of claim 17, wherein if a current number of nodes installed is equal to or more than a total number of nodes to be installed, further comprising instructions for ending the installation process.

* * * * *